United States Patent
Benhase et al.

(10) Patent No.: US 9,372,908 B2
(45) Date of Patent: *Jun. 21, 2016

(54) MERGING AN OUT OF SYNCHRONIZATION INDICATOR AND A CHANGE RECORDING INDICATOR IN RESPONSE TO A FAILURE IN CONSISTENCY GROUP FORMATION

(71) Applicant: International Business Machines Corporation, Armonk, NY (US)

(72) Inventors: Michael T. Benhase, Tucson, AZ (US); Theresa M. Brown, Tucson, AZ (US); Mark L. Lipets, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,724

(22) Filed: Oct. 6, 2015

(65) Prior Publication Data

US 2016/0026403 A1    Jan. 28, 2016

Related U.S. Application Data

(63) Continuation of application No. 14/070,226, filed on Nov. 1, 2013, now Pat. No. 9,251,233, which is a continuation of application No. 13/654,053, filed on Oct. 17, 2012, now Pat. No. 9,251,231.

(51) Int. Cl.
*G06F 12/16*    (2006.01)
*G06F 17/30*    (2006.01)
(Continued)

(52) U.S. Cl.
CPC .......... *G06F 17/30575* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS

| | | | |
|---|---|---|---|
| 5,522,037 A | 5/1996 | Kitagawa et al. | |
| 5,742,792 A | 4/1998 | Yanai et al. | |

(Continued)

FOREIGN PATENT DOCUMENTS

| | | |
|---|---|---|
| CN | 102347897 | 2/2012 |
| CN | 102354293 | 2/2012 |
| JP | 2003173240 | 6/2003 |

OTHER PUBLICATIONS

English translation of JP2003173240.

(Continued)

*Primary Examiner* — Prasith Thammavong
*Assistant Examiner* — Jason Blust
(74) *Attorney, Agent, or Firm* — Rabindrath Dutta; Konrad Raynes Davda & Victor LLP

(57) ABSTRACT

A first data structure stores indications of storage locations that need to be copied for forming a consistency group. A second data structure stores indications of new host writes subsequent to starting a point in time copy operation to form the consistency group. Read access is secured to a metadata storage area and a determination is made as to whether the second data structure indicates that there are any new host writes. In response to determining that the second data structure indicates that there are new host writes, write access is secured to the metadata storage area, the first data structure is updated with contents of the second data structure to determine which additional storage locations need to be copied for formation of a next consistency group, and the second data structure is updated to indicate that that the second data structure is in an initialized state.

18 Claims, 9 Drawing Sheets

(51) Int. Cl.
*G06F 3/06* (2006.01)
*G06F 11/14* (2006.01)
*G06F 11/20* (2006.01)

(52) U.S. Cl.
CPC .......... *G06F3/0683* (2013.01); *G06F 11/1451* (2013.01); *G06F 11/2082* (2013.01); *G06F 11/2074* (2013.01); *G06F 2201/84* (2013.01)

(56) References Cited

U.S. PATENT DOCUMENTS

| | | | |
|---|---|---|---|
| 7,188,222 | B2 | 3/2007 | Micka et al. |
| 7,539,892 | B2 | 5/2009 | Jean-Denis et al. |
| 7,734,883 | B2 | 6/2010 | Spear et al. |
| 7,818,522 | B2 | 10/2010 | Bartfai et al. |
| 8,121,007 | B2 | 2/2012 | Nagar et al. |
| 8,433,864 | B1 * | 4/2013 | Narayanan .......... G06F 11/1448 711/162 |
| 8,539,122 | B2 | 9/2013 | Biehler et al. |
| 2003/0170012 | A1 | 9/2003 | Cochran |
| 2004/0260899 | A1 | 12/2004 | Kern et al. |
| 2005/0071586 | A1 | 3/2005 | Bartfai et al. |
| 2005/0071589 | A1 | 3/2005 | Tross et al. |
| 2005/0071710 | A1 | 3/2005 | Micka et al. |
| 2005/0081091 | A1 | 4/2005 | Bartfai et al. |
| 2010/0023716 | A1 * | 1/2010 | Nemoto .............. G06F 11/1451 711/162 |
| 2011/0208694 | A1 | 8/2011 | Bitar et al. |
| 2012/0078848 | A1 | 3/2012 | Jennas, II et al. |
| 2012/0221823 | A1 | 8/2012 | Benhase et al. |
| 2014/0108345 | A1 | 4/2014 | Brown et al. |
| 2014/0108349 | A1 | 4/2014 | Benhase et al. |
| 2014/0108753 | A1 | 4/2014 | Benhase et al. |

OTHER PUBLICATIONS

English translation of CN102347897 Feb. 8, 2012.
English translation of CN102354293 Feb. 15, 2012.
"Maintaining Consistency Groups with Space Efficient Volumes", IP.com PriorArtDatabase, Technical Disclosure, IP.com No. IPCOM000211741D, Oct. 14, 2011, pp. 1-5.
Tang, et al., "Fast Differential Backup Method", abstract, Computer Engineering, vol. 34, Issue 11, pp. 255-257, Jun. 2008.
PCT international search report and written opinion dated Mar. 25, 2014 for Serial No. PCT/IB2013/058875 filed Sep. 26, 2013.
PCT International Search Report and written opinion dated Apr. 3, 2014 for Serial No. PCT/IB2013/058876 filed Sep. 26, 2013.
Office Action dated Dec. 13, 2013, pp. 25, for U.S. Appl. No. 13/654,041, filed Oct. 17, 2012.
Response dated Mar. 13, 2014, pp. 12 to Office Action dated Dec. 13, 2013, pp. 25, for U.S. Appl. No. 13/654,041, filed Oct. 17, 2012.
Final Office Action dated Jun. 13, 2014, pp. 27, to U.S. Appl. No. 13/654,041, filed Oct. 17, 2012.
RCE Amendment filed Sep. 15, 2014, pp. 13, to Final Office Action dated Jun. 13, 2014, pp. 27, to U.S. Appl. No. 13/654,041, filed Oct. 17, 2012.
Office Action dated Dec. 31, 2014, pp. 30, for U.S. Appl. No. 13/654,041, filed Oct. 17, 2012.
Response to Office Action, dated Mar. 31, 2015, for U.S. Appl. No. 13/654,041, filed Oct. 17, 2012, invented by Michael T. Benhase et al., Total 15 Pages.
Notice of Allowance dated Jul. 17, 2015, pp. 29, for U.S. Appl. No. 13/654,041, filed Oct. 17, 2012.
Notice of Allowance 2 for U.S. Appl. No. 13/654,041, dated Oct. 6, 2015, 12 pages.
Office Action dated Jun. 2, 2014, pp. 41, for U.S. Appl. No. 13/654,053, filed Oct. 17, 2012.
Response dated Sep. 2, 2014, pp. 13, to Office Action dated Jun. 2, 2014, pp. 41, for U.S. Appl. No. 13/654,053, filed Oct. 17, 2012.
Final Office Action dated Oct. 17, 2014, pp. 40, for U.S. Appl. No. 13/654,053, filed Oct. 17, 2012.
RCE Response dated Dec. 31, 2014, pp. 15, to Final Office Action dated Oct. 2, 2014, pp. xx, for U.S. Appl. No. 13/654,053, filed Oct. 17, 2012.
Office Action, dated Mar. 5, 2015, for U.S. Appl. No. 13/654,053, filed Oct. 17, 2012, invented by Michael T. Benhase et al., Total 47 Pages.
Response dated May 28, 2015, pp. 13, to Office Action dated Mar. 5, 2015, pp. 47, for U.S. Appl. No. 13/654,053.
Notice of Allowance dated Jun. 12, 2015, pp. 12, for U.S. Appl. No. 13/654,053.
Notice of Allowance for U.S. Appl. No. 13/654,053, Oct. 6, 2015, 9 pp.
Office Action dated Jul. 3, 2014, pp. 33, for U.S. Appl. No. 13/654,053, filed Oct. 17, 2012.
Response dated Oct. 3, 2014, p. 13, to Office Action dated Jul. 3, 2014, pp. 33, for U.S. Appl. No. 13/654,053, filed Oct. 17, 2012.
Final Office Action, dated Jan. 30, 2015, for U.S. Appl. No. 14/070,226, filed Nov. 1, 2013, invented by Michael T. Benhase et al., Total 42 Pages.
Response dated Apr. 30, 2015, pp. 9, to Final Office Action dated Jan. 30, 2015, pp, 42, for U.S. Appl. No. 14/070,226.
Notice of Allowance dated May 19, 2015, pp. 12, for U.S. Appl. No. 14/070,226.
Notice of Allowance 2 for U.S. Appl. No. 14/070,226, dated Sep. 29, 2015, 13 pp.
U.S. Appl. No. 14/876,726, filed Oct. 6, 2015, entitled "Merging an Out of Synchronization Indicator and a Change Recording Indicator in Response to a Failure in Consistency Group Formation", invented by M.T. Benhase et al., 31 pp.
Notice of Allowance dated Mar. 14, 2016, pp. 24 for U.S. Appl. No. 14/876,726, filed Oct. 6, 2015.

\* cited by examiner

MERGING AN OUT OF SYNCHRONIZATION INDICATOR AND A CHANGE RECORDING INDICATOR IN RESPONSE TO A FAILURE IN CONSISTENCY GROUP FORMATION

CROSS-REFERENCE TO RELATED APPLICATIONS

This application is a continuation of application Ser. No. 14/070,226 filed on Nov. 1, 2013, wherein application Ser. No. 14/070,226 is a continuation of application Ser. No. 13/654,053 filed on Oct. 17, 2012, and wherein application Ser. No. 14/070,226 and application Ser. No. 13/654,053 are incorporated herein by reference in their entirety.

BACKGROUND

1. Field

The disclosure relates to a method, system, and article of manufacture for merging an out of synchronization indicator and a change recording indicator in response to a failure in consistency group formation.

2. Background

Certain mirroring mechanisms provide data replication over extended distances between two sites for disaster recovery. If adequate bandwidth exists, such mirroring mechanisms may provide a recovery point objective of as low as 3-5 seconds or less between the two sites at extended distances, with little or no performance impact on the application at the primary site. Certain mirroring mechanisms may copy the data asynchronously and also form a consistency group at a regular interval, allowing a clean recovery of data.

Certain mirroring mechanisms may pause updates of the primary volumes and then use a bitmap to drain updates from the primary volumes to the secondary volumes at the remote site. After all primary updates have been drained, the secondary volumes are used as the source for a point in time copy to tertiary volumes at the recovery site. This ensures that the tertiary copy of the volumes has a point-in-time consistency. By grouping many volumes into a single session, multiple volumes may be copied to the recovery site simultaneously, while maintaining point-in-time consistency across those volumes.

Such mirroring mechanisms may control the formation of consistency groups for data consistency. A consistency group is a collection of volumes across multiple storage units that are managed together when creating consistent copies of data. The order of dependent writes is preserved in consistency groups. The formation of these consistency groups may be controlled by a primary storage unit, which sends commands over remote mirror and copy volumes to remote storage units.

SUMMARY OF THE PREFERRED EMBODIMENTS

Provided are a method, a system, and a computer program product in which a first data structure stores indications of storage locations that need to be copied for forming a consistency group. A second data structure stores indications of new host writes subsequent to starting a point in time copy operation to form the consistency group, where the first data structure and the second data structure are maintained in one or more metadata storage areas. Read access is secured to a metadata storage area and a determination is made as to whether the second data structure indicates that there are any new host writes. In response to determining that the second data structure indicates that there are new host writes, write access is secured to the metadata storage area, the first data structure is updated with contents of the second data structure to determine which additional storage locations need to be copied for formation of a next consistency group, and the second data structure is updated to indicate that that the second data structure is in an initialized state.

In further embodiments, the first data structure is an out of synchronization bitmap, and the second data structure is a change recording bitmap.

In additional embodiments, the metadata storage area is a metadata track, and the write access to the metadata track is necessary if any bit the change recording bitmap is not zero.

In additional embodiments, the updating of the out of synchronization bitmap comprises performing an OR operation of corresponding bits of the change recording bitmap and the out of synchronization bitmap.

In yet further embodiments, a remote copy operation of primary volumes of a primary computational device to secondary volumes of a remote computational device is performed. The point in time copy operation is performed to generate point in time copies of the secondary volumes of the remote computational device to tertiary volumes of the remote computational device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Exemplary Embodiments

Figure 1:
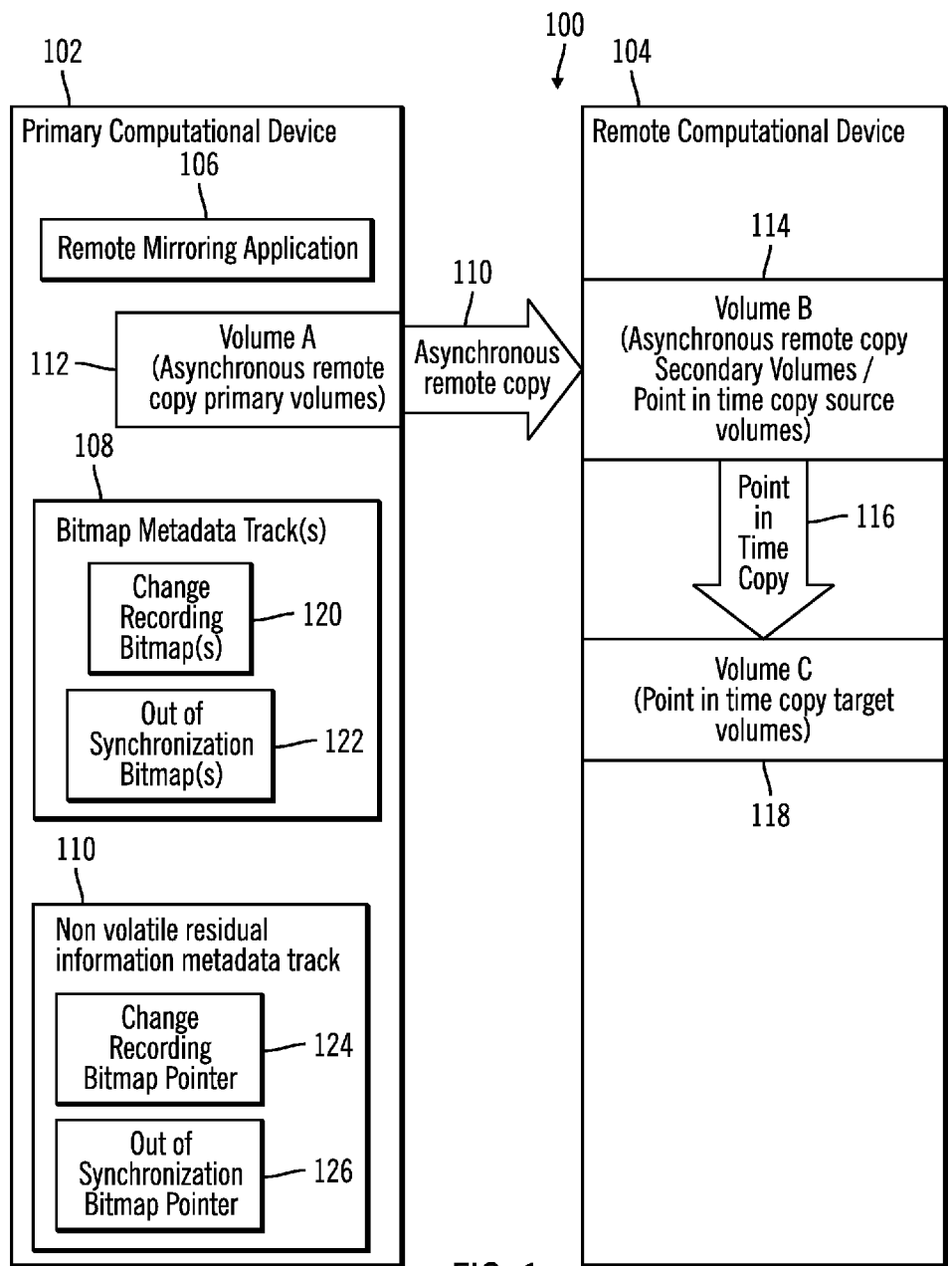
FIG. 1 illustrates a block diagram of a computing environment that includes a primary computational device and a remote computational device, in accordance with certain embodiments.

FIG. 1 illustrates a block diagram of a computing environment 100 that includes a primary computational device 102 and a remote computational device 104, in accordance with certain embodiments.

The primary computational device 102 and the remote computational device 104 may comprise any suitable computation device, such as, a server, a personal computer, a storage controller, a controller, a blade computer, a telephony device, a mainframe computer, etc. The primary computational device 102 and the remote computational device 104 may be coupled over a network, such as the Internet, an intranet, a storage area network, etc. The primary computational device 102 and the remote computational device 104 may be coupled to one or more storage devices via an interface.

The primary computational device 102 and the remote computational device 104 may receive commands from one or more host computational devices that desire access to data controlled by the primary computational device 102 and the remote computational device 104.

The primary computational device 102 may include a remote mirroring application 106, bitmap metadata tracks 108, and non volatile residual information metadata tracks 110 (also referred to as metadata tracks). In certain embodiments, under the control of the remote mirroring application 106, asynchronous remote copy operations 110 are performed to asynchronously copy exemplary volume A 112 (i.e., a storage volume) maintained by the primary computational device 102 to the exemplary volume B 114 maintained by the remote computational device 104. The exemplary volume A 112 may also be referred to as an asynchronous remote copy primary volume, and a plurality of such volumes may be controlled via the primary computational device 102. The exemplary volume B 114 may also be referred to as an asynchronous remote copy secondary volume, and a plurality of such volumes may be controlled via the remote computational device 104.

In certain embodiments, point in time copy operations 116 are performed to create point in time copies (i.e., a consistent copy at an instant of time) of volume B 114 to volume C 118. Volume B 114 which is an asynchronous remote copy secondary volume may also be a point in time copy source volume, and volume C 118 may comprise a point in time copy target volume. A plurality of volumes similar to volume B 114 or volume C 118 may be controlled by the remote computational device 104.

When a volume is created, bitmap metadata tracks 108 are allocated for copy services use for the remote mirroring application 106. The number of bitmap metadata tracks allocated depends on the number of customer tracks on the volume. In certain embodiments, each bitmap metadata track includes a plurality of data fields that may be indexed sequentially. The same data field on every bitmap metadata track may represent the same bitmap. In other words, that one bitmap is scattered across all bitmap metadata tracks occupying the same data field on each track. When a bitmap (such as the change recording bitmap 120 or the out of synchronization bitmap 122) is allocated, a unique field/bitmap index that corresponds to the bitmap is assigned. The information about the bitmap index that is currently used by each process is kept in the non-volatile residual information metadata track 110. The information may be maintained via a change recording bitmap pointer 124 and an out of synchronization bitmap pointer 126.

Therefore, FIG. 1 illustrates a computing environment 100 in which asynchronous remote copy and point in time copy operations are performed by using change recording bitmaps 120 and out of synchronization bitmaps 122 to generate consistency groups.

Figure 2:
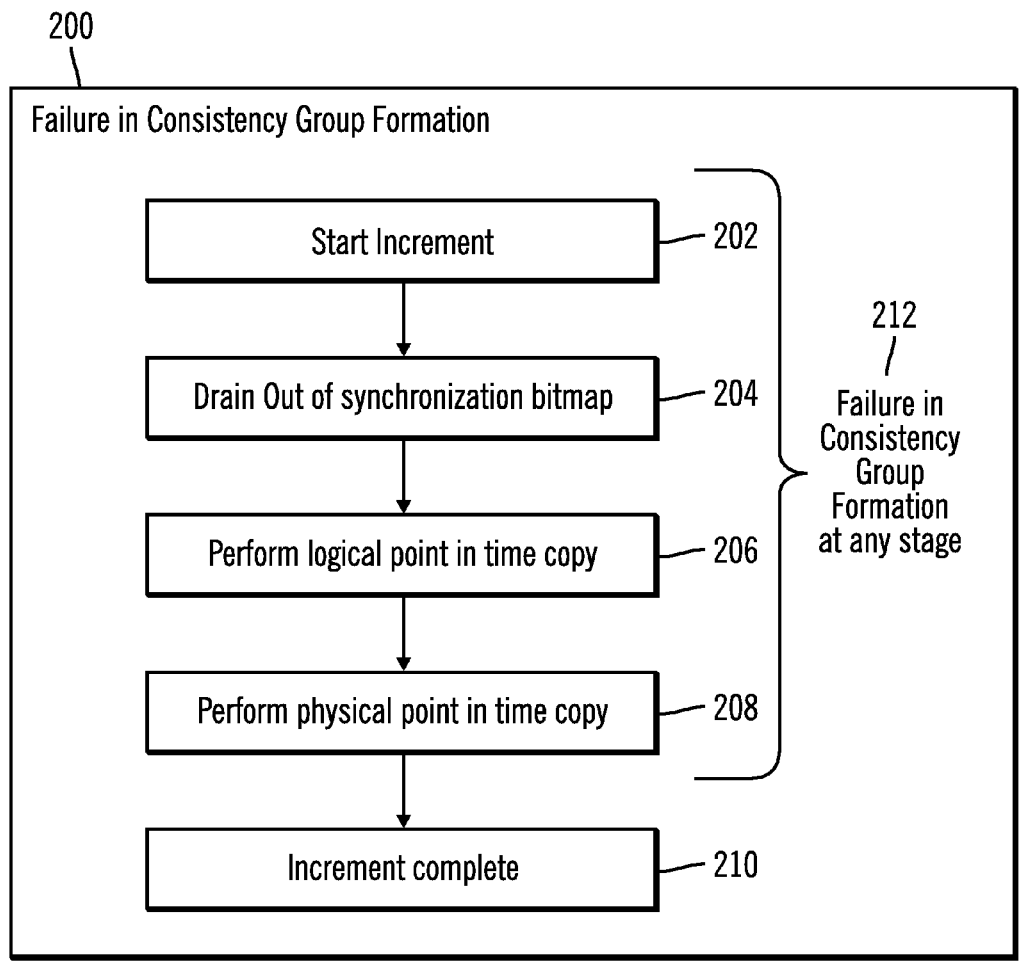
FIG. 2 illustrates a block diagram that shows failure in consistency group formation, in accordance with certain embodiments.

FIG. 2 illustrates a block diagram 200 that shows failure in consistency group formation, in accordance with certain embodiments. The operations shown in block diagram 200 may be performed by the computational devices 102 and 104 in the computing environment 100.

In certain embodiments, attempts for consistency group formation in the computing environment 100 that performs remote mirroring is comprised of the following operations as shown in block 200:

1. Start Increment (block 202);
2. Drain out of synchronization bitmap (block 204);
3. Perform logical point in time copy (block 206);
4. Perform physical point in time copy (block 208); and
5. Increment Complete (block 210).

When all operations 202, 204, 206, 208, 210 have completed successfully for all the volumes in a session, this is considered a successful consistency group formation. If there is a failure on remote copy or point in time copy operations or network error during the operations 202, 204, 206, 208 or other operations, there may be failure in consistency group formation (as shown via reference numeral 212)

In case of a failure in consistency group formation, both the change recording bitmap and the out of synchronization bitmap have vital data and are merged for all volumes in the session, to generate an updated out of synchronization bitmap for the next consistency group. This merge operation may be time consuming since in some cases it has to modify almost all bitmap metadata tracks allocated for a volume. Additionally, new consistency group formation cannot be started until the merge operation has completed. Furthermore, this may generate many modified bitmap metadata tracks in cache that may create more contention.

In certain embodiments, a failover may comprise an event in which a system in an exemplary cluster may automatically switch over to one or more backup nodes in the event of a failure of a node. In certain embodiments, a central electronics complex (CEC) failover may occur, in which if one CEC fails, then the system performs a failover to another CEC. Having a lot of modified data in cache affects failover time since every lost metadata track may have to be recovered by setting all the corresponding bits in the out of synchronization bitmap. These issues may become worse with increased volume size.

In the start increment phase (block 202), change recording is started for all volumes in the session. New host writes are recorded in the change recording bitmap 120. All tracks marked for asynchronous remote copy in the out of synchronization bitmap 122 are transferred (at block 204) to the remote site 104. Once the out of synchronization bitmap 122 has been drained (i.e., all bits that were set to 1 to indicate that the corresponding track has to be consistently copied to the remote computational device 104 have been set to 0), the logical and physical point in time copies can be made (at blocks 206, 208).

If the point in time copies are successfully generated, then this may result in the formation of a successful consistency group. If at any time one of the steps is not completed successfully, the consistency group is considered failed and the point in time copy relationship may have to be reverted. Certain embodiments provided in this disclosure address the situation when consistency group formation fails.

In case of a failure in the formation of consistency group, certain operations are performed during increment complete (at block 210). In certain embodiments the change recording is stopped, and the out of synchronization bitmap is updated by performing OR operations of the corresponding bits of the change recording bitmap into the out of synchronization bitmap. The bits of the change recording bitmap are changed to zeros via a background task. In such a situation, control returns to block 202 once again and new writes are recorded in the change recording bitmap and the updated out of synchronization bitmap is used for draining.

To speed up the process of merging the out of synchronization bitmap and change recording bitmap, in certain embodiments prior to acquiring "write" access to bitmap metadata tracks, "read" access is acquired (the merging of change recording bitmap into the out of synchronization bitmap may also be referred to as a merger of bitmaps). If on read access the bits of the change recording bitmap are all zero, then no merge is needed. Therefore, in certain embodiments, no "actual" merge is required on bitmap metadata tracks with "clean" change recording bitmap fields which means that there are just a few number of modified bitmap metadata tracks. In some embodiments where host "writes" are not spread across the volume, the embodiments may speed up consistency group formation which may result in a lower recovery point objective.

Figure 3:
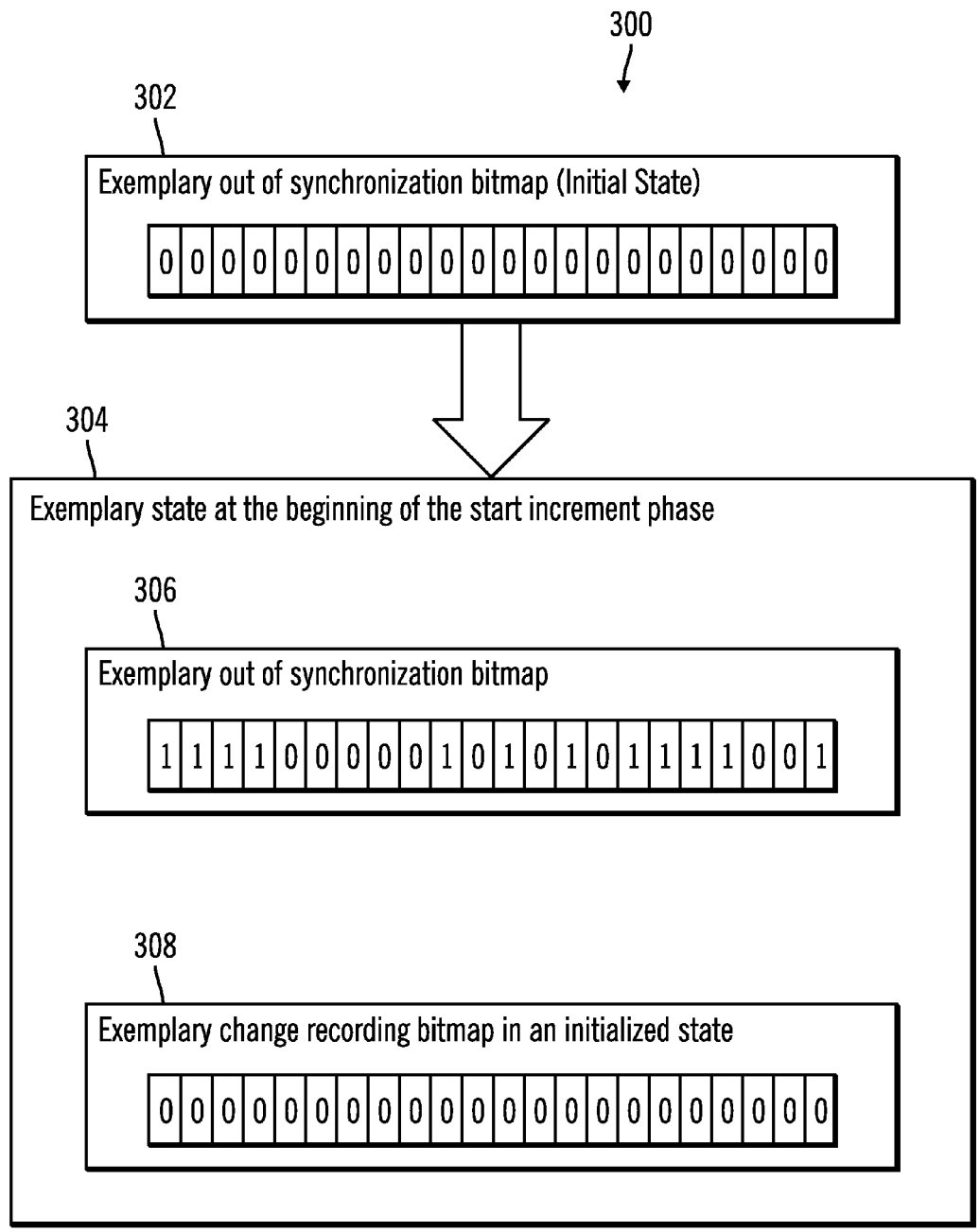
FIG. 3 illustrates a block diagram that shows states of certain bitmaps, in accordance with certain embodiments.

FIG. 3 illustrates a block diagram 300 that shows states of certain bitmaps, in accordance with certain embodiments. An exemplary out of synchronization bitmap 302 is shown in an initial state in which all bits are set to 0, i.e., no tracks remain to be consistently copied from the primary computational device 102 to the remote computational device 104.

Block 304 shows the state of an exemplary out of synchronization bitmap 306 and an exemplary change recording bitmap 308 at the beginning of the start increment phase 202 of FIG. 2. In such a state, the exemplary change recording bitmap 308 is in an initialized state and has all bits set to 0 and the exemplary out of synchronization bitmap has at least some bits set to 1 to indicate tracks that have yet to be asynchronously copied to the remote computational device 104 from the primary computational device 102.

Figure 4:
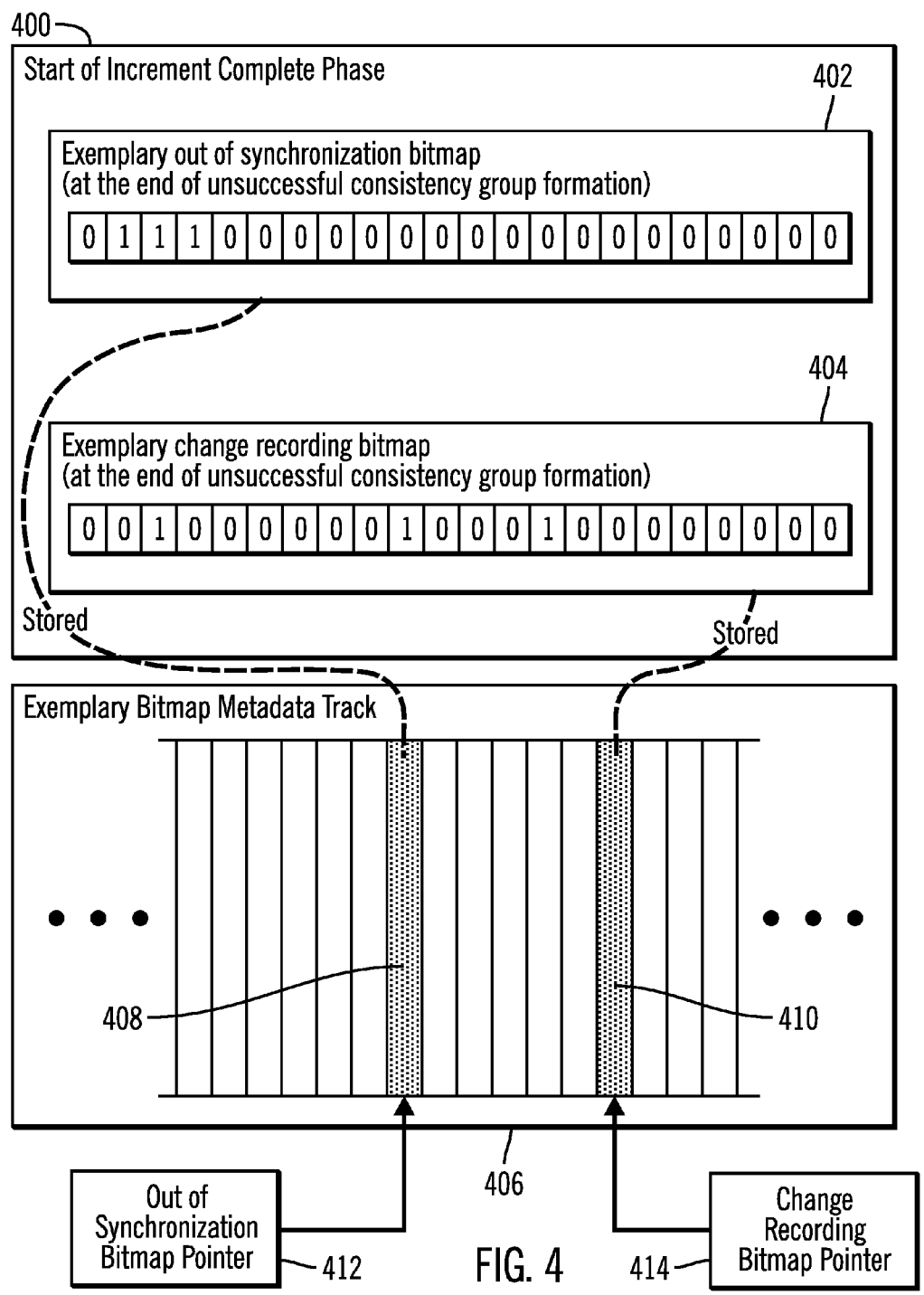
FIG. 4 illustrates a block diagram that shows states of certain bitmaps at the start of increment complete phase, in accordance with certain embodiments.

FIG. 4 illustrates a block diagram 400 that shows states of certain bitmaps at the start of the increment complete phase, in accordance with certain embodiments. The state of bitmaps shown in FIG. 4 may be caused by unsuccessful conclusion of the point in time copy operations 206, 208 to generate consistency groups. Unsuccessful consistency group formation may also be caused because of a failure in remote copy, a network error, or for other reasons.

In the state shown in FIG. 4, the bits of the exemplary out of synchronization bitmap 402 may or may not be all set to all 0 depending on whether all tracks have copied over to the remote computational device 104, i.e., the out of synchronization bitmap 402 has been drained. As a track is transferred, the corresponding bit in the out of synchronization bitmap 402 is changed from 1 to 0. In the particular example shown in FIG. 4, not all tracks have been copied over to remote computational device 104 when there is an unsuccessful formation of consistency group and hence certain bits of the exemplary out of synchronization bitmap 402 are shown to be one.

In FIG. 4, the exemplary change recording bitmap 404 has at least some bits set to 1, to indicate tracks modified by host writes during the point in time copy operations (blocks 206, 208 of FIG. 2 show the point in time copy operations).

FIG. 4 also shows an exemplary bitmap metadata track 406, in which at location 408 the out of synchronization bitmap 402 is stored. Furthermore, at location 410 the change recording bitmap 404 is stored.

FIG. 4 also shows that the out of synchronization bitmap pointer 412 points at location 408 of the exemplary bitmap metadata track 406 and the change recording bitmap pointer 414 points to location 410 of the bitmap metadata track 406.

Figure 5:
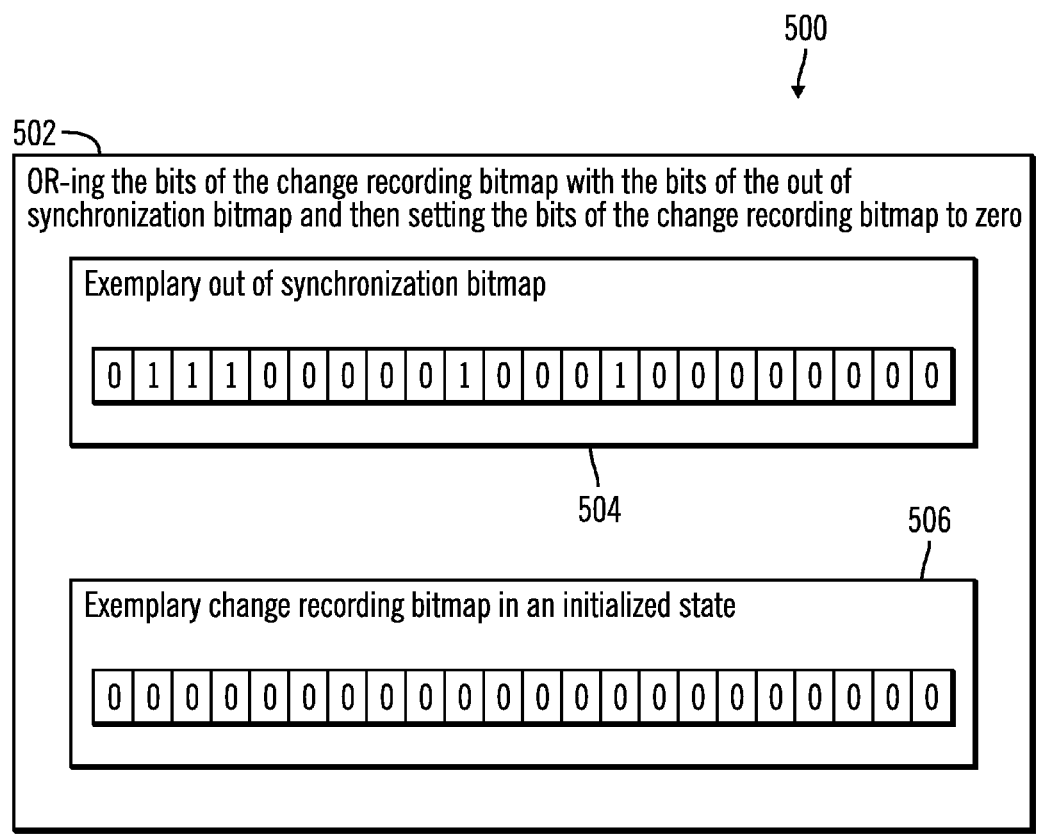
FIG. 5 illustrates a block diagram that shows OR operations being performed with bits of an out of synchronization bitmap and a change recording bitmap, in accordance with certain embodiments.

FIG. 5 illustrates a block diagram 500 that shows how the two bitmaps 402 and 404 (shown in FIG. 4) are merged in response to a failure in consistency group formation, in accordance with certain embodiments.

Corresponding bits of the out of synchronization bitmap 402 and the change recording bitmaps undergo "OR" operations to generate the exemplary out of synchronization bitmap 504. The exemplary change recording bitmap 506 has all the bits set to zero after the merger, i.e., the exemplary change recording bitmap 506 is in an initialized state. The two bitmaps 504, 506 generated after the merger are shown in block 502.

Therefore, in certain embodiments, when a remote mirroring session is unsuccessful in forming a consistency group, the out of synchronization bitmap is updated by merging with the change recording bitmap. The merging of change recording bitmap into the out of synchronization bitmap is performed by OR operations on corresponding bits.

A new round of consistency group formation may start with the out of synchronization bitmap 504 and the change recording bitmap 506 shown in block 502.

Figure 6:
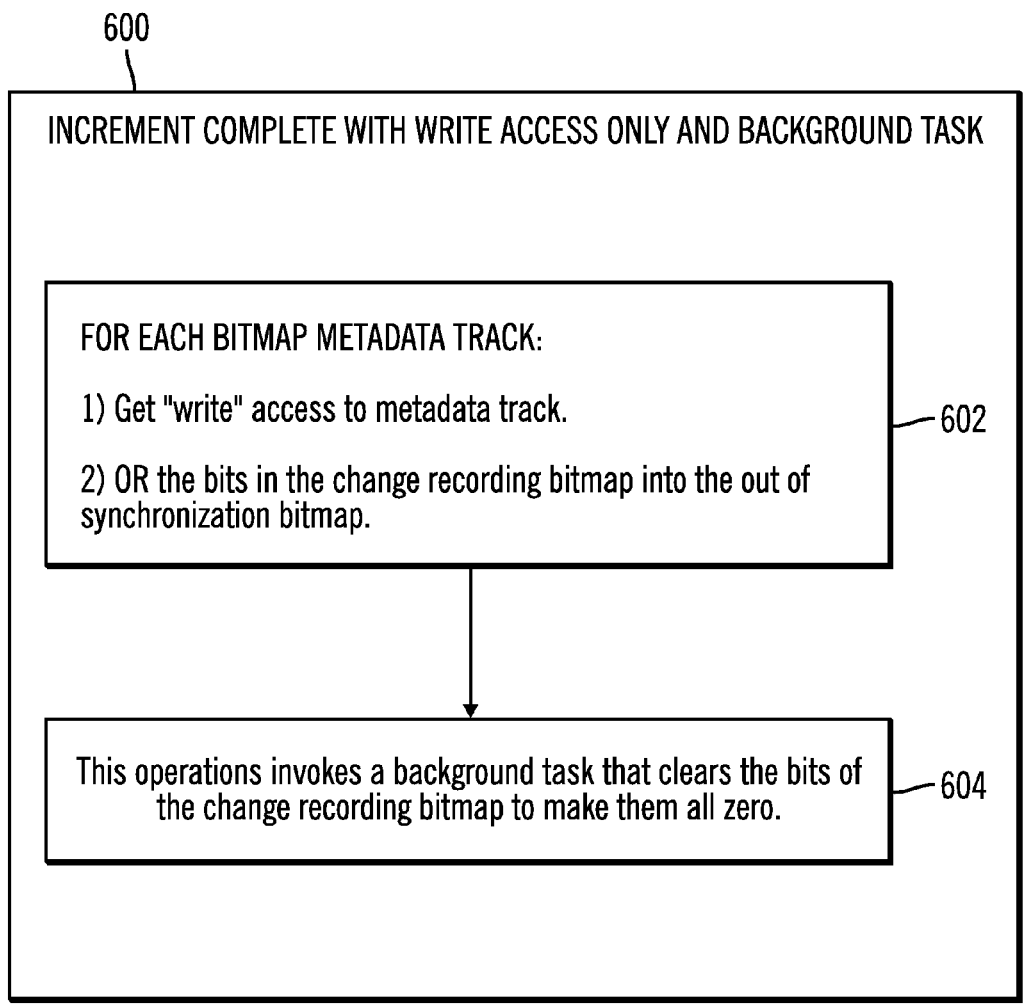
FIG. 6 illustrates a first flowchart that shows operations performed in the computing environment, in accordance with certain embodiments.

FIG. 6 illustrates a first flowchart 600 that shows operations performed in the computing environment 100, in accordance with certain embodiments. The operations shown in FIG. 6 may be performed via the primary computational device 102 in the increment complete phase 210. Certain embodiments provide improved time and space efficient mechanisms with operations that are different from those shown in FIG. 6.

In FIG. 6, for each bitmap metadata track, write access is obtained to the metadata track, and operations are performed to OR the bits in the change recording bitmap into the out of synchronization bitmap (at block 602). A background process clears the bits of the change recording bitmap to make the bits all zero. Such operations require write access of the metadata track, which may be time and resource inefficient.

Figure 7:
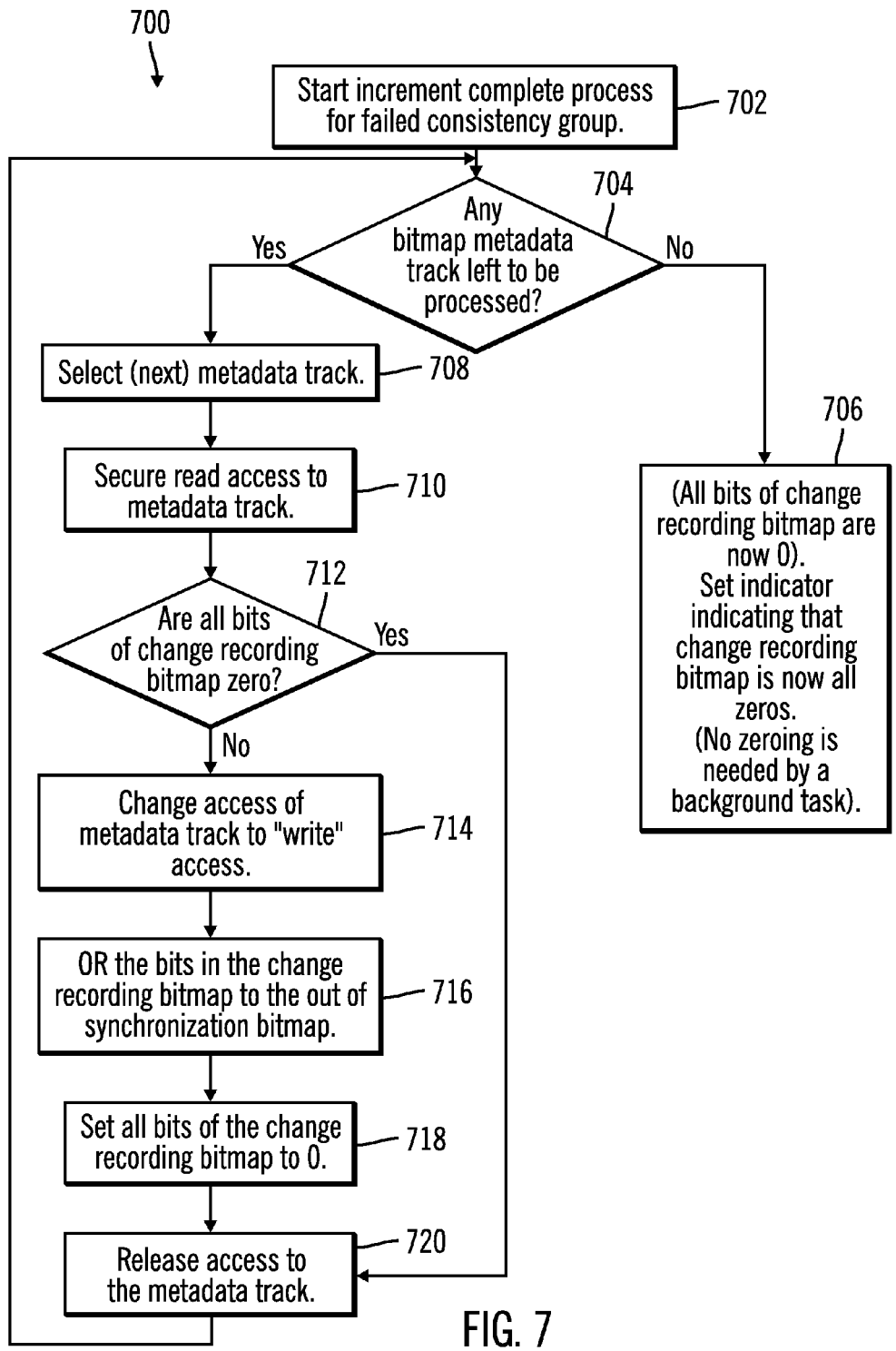
FIG. 7 illustrates a second flowchart that shows operations performed in the computing environment, in accordance with certain embodiments.

FIG. 7 illustrates a second flowchart 700 that shows operations performed in the computing environment 100, in accordance with certain embodiments. The operations shown in FIG. 7 may be performed via the primary computational device 102. The operations shown in FIG. 7 provide improvements in processing time and lesser usage of cache storage space in comparison to operations shown in FIG. 6.

Control starts at block 702 where the start increment complete process for a failed consistency group starts and metadata track processing starts. A determination is made at block 704 as to whether any bitmap metadata track is left to be processed, and if so, then the metadata track is selected (at block 708). Read access is secured (at block 710) to the metadata track and a determination is made (at block 712) as to whether all bits in the change recording bitmap are zero.

If a determination is made that all bits of the change recording bitmap are zero (at block 712) then significant time is saved over the operations shown in FIG. 6, as no merger needs to be performed for the track, and read access to the metadata track is released (at block 720). In such embodiments, the state of the bitmap metadata track (irrespective of whether or not the bitmap metadata track has been modified) remains unchanged.

If at block 712, a determination is made that not all bits of the change recording bitmap are zero, then control proceeds to block 714, and the access of the metadata track is changed to "write" access. Thus, unlike in FIG. 6 where "write" access was acquired indiscriminately for metadata tracks, in FIG. 7 "write" access which is more time and resource inefficient is acquired only when "read" access is inadequate and the change recording bitmap is not all zero.

Control proceeds to block 716 where an operation is performed to OR the bits in the change recording bitmap to the out of synchronization bitmap, and then all bits of the change recording bitmap are set (at block 718) to zero. Write access to the metadata track is released (at block 720) and control returns to block 704.

If at block 704, a determination is made that no metadata track is left to be processed then all bits of the change recording bitmap are already zero, and at block 706, an indicator indicating that the change recording bitmap is all zeros is set. Unlike in operations shown in FIG. 6, no background task to change the bits of the change recording bitmap to zero is needed.

Figure 8:
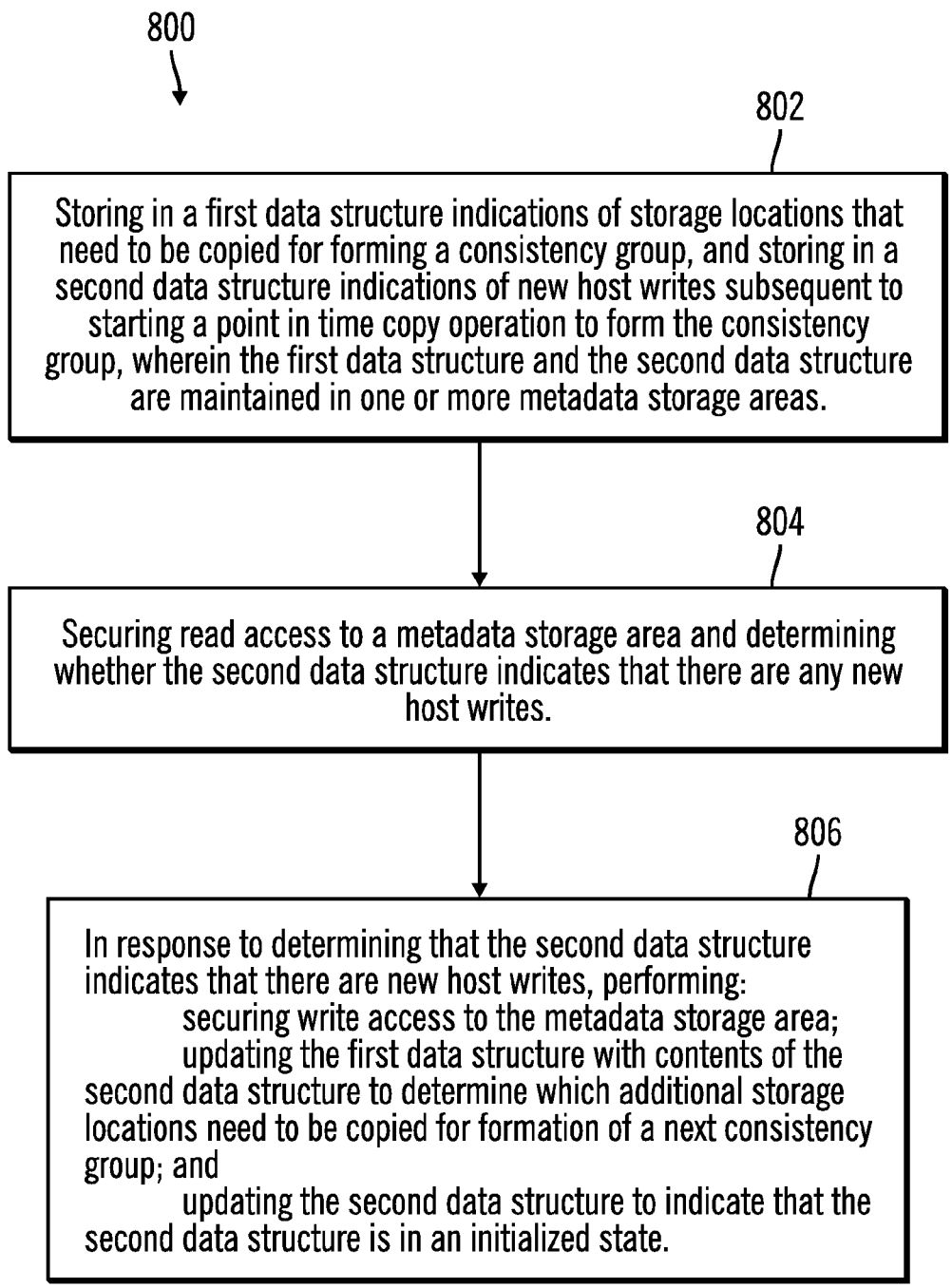
FIG. 8 illustrates a third flowchart that shows operations performed in the computing environment, in accordance with certain embodiments.

FIG. 8 illustrates a third flowchart 800 that shows operations performed in the computing environment 100, in accordance with certain embodiments. The operations shown in FIG. 8 may be performed via the primary computational device 102. The operations shown in FIG. 8 provide improvements in processing time and lesser usage of storage space in comparison to operations shown in FIG. 6.

Control starts at block 802 in which a first data structure (e.g., an out of synchronization bitmap) stores indications of storage locations (e.g., tracks) that need to be copied for forming a consistency group. A second data structure (e.g. a change recording bitmap) stores indications of new host writes subsequent to starting a point in time copy operation to form the consistency group, where the first data structure and the second data structure are maintained in one or more metadata storage areas.

Control proceeds to block 804, in which read access is secured to a metadata storage area (e.g., a metadata track 110) and a determination is made as to whether the second data structure indicates that there are any new host writes.

In response to determining (at block 804) that the second data structure indicates that there are new host writes, write access is secured to the metadata storage area, the first data structure is updated with contents of the second data structure to determine which additional storage locations need to be copied for formation of a next consistency group, and the second data structure is updated to indicate that the second data structure is in an initialized state. While in the initialized state, the second data structure indicates that no host writes have been recorded in the second data structure.

Therefore, FIGS. 1-8 illustrate certain embodiments in which in case of a failure of consistency group formation, the merging of the out of synchronization bitmap and the change recording bitmap are performed by first performing a read access to the metadata track, and only if necessary write access to the metadata track is acquired. Improved space utilization and less processing time are achieved in such embodiments (described at least in FIGS. 7 and 8) in comparison to mechanisms that indiscriminately acquire write access to metadata tracks (as shown in FIG. 6).

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
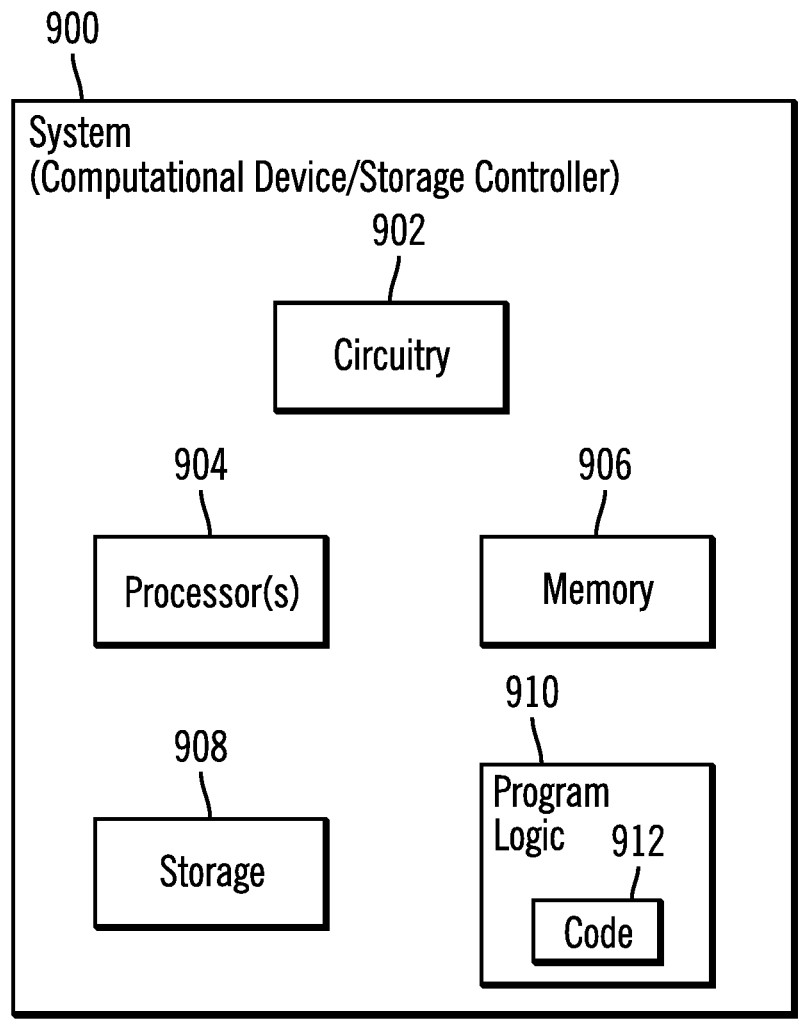
FIG. 9 illustrates a block diagram of a computational system that shows certain elements that may be included in at least the computational devices of FIG. 1, in accordance with certain embodiments.

FIG. 9 illustrates a block diagram that shows certain elements that may be included in the computational devices 102, 104 in accordance with certain embodiments. The system 900 may comprise the computational devices 102, 104 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
  storing in a plurality of first data structures indications that indicate storage locations that need to be copied for forming a consistency group, and storing in a plurality of second data structures indications that indicate new host writes subsequent to starting a point in time copy operation to form the consistency group, wherein a first data structure and a second data structure are maintained in a track, and a plurality of tracks are maintained in a metadata storage area;

in response to determining that the second data structure indicates that there are new host writes, updating the first data structure with contents of the second data structure to determine which additional storage locations need to be copied for formation of a next consistency group by performing an OR operation of corresponding bits of the first data structure and the second data structure, and updating the second data structure to indicate that the second data structure is in an initialized state;

in response to determining that the second data structure indicates that there are no new host writes, updating of the first data structure with the contents of the second data structure is not performed; and in response to processing all of the plurality of tracks maintained in the metadata storage area, setting an indicator by a non-background task to indicate that all of the plurality of second data structures are now in the initialized state.

2. The method of claim 1, wherein the first data structure is an out of synchronization bitmap.

3. The method of claim 2, and the second data structure is a change recording bitmap.

4. The method of claim 3, wherein the metadata storage area is a metadata track, and wherein a write access to the metadata track is necessary if any bit of the change recording bitmap is not zero.

5. The method of claim 4, wherein the updating of the out of synchronization bitmap comprises performing an OR operation of corresponding bits of the change recording bitmap and the out of synchronization bitmap.

6. The method of claim 1, the method further comprising:
performing a remote copy operation of primary volumes of a primary computational device to secondary volumes of a remote computational device; and
performing a point in time copy operation to generate point in time copies of the secondary volumes of the remote computational device to tertiary volumes of the remote computational device.

7. A system, comprising:
a memory; and
a processor coupled to the memory, wherein the processor performs operations, the operations comprising:
storing in a plurality of first data structures indications that indicate storage locations that need to be copied for forming a consistency group, and storing in a plurality of second data structures indications that indicate new host writes subsequent to starting a point in time copy operation to form the consistency group, wherein a first data structure and a second data structure are maintained in a track, and a plurality of tracks are maintained in a metadata storage area;

in response to determining that the second data structure indicates that there are new host writes, updating the first data structure with contents of the second data structure to determine which additional storage locations need to be copied for formation of a next consistency group by performing an OR operation of corresponding bits of the first data structure and the second data structure, and updating the second data structure to indicate that the second data structure is in an initialized state;

in response to determining that the second data structure indicates that there are no new host writes, updating of the first data structure with the contents of the second data structure is not performed; and in response to processing all of the plurality of tracks maintained in the metadata storage area, setting an indicator by a non-background task to indicate that all of the plurality of second data structures are now in the initialized state.

8. The system of claim 7, wherein the first data structure is an out of synchronization bitmap.

9. The system of claim 8, and the second data structure is a change recording bitmap.

10. The system of claim 9, wherein the metadata storage area is a metadata track, and wherein a write access to the metadata track is necessary if any bit of the change recording bitmap is not zero.

11. The system of claim 10, wherein the updating of the out of synchronization bitmap comprises performing an OR operation of corresponding bits of the change recording bitmap and the out of synchronization bitmap.

12. The system of claim 7, the operations further comprising:
performing a remote copy operation of primary volumes of a primary computational device to secondary volumes of a remote computational device; and
performing a point in time copy operation to generate point in time copies of the secondary volumes of the remote computational device to tertiary volumes of the remote computational device.

13. A computer program product, the computer program product comprising a non-transitory computer readable storage medium having computer readable program code embodied therewith, the computer readable program code configured to perform operations, the operations comprising:
storing in a plurality of first data structures indications that indicate storage locations that need to be copied for forming a consistency group, and storing in a plurality of second data structures indications that indicate new host writes subsequent to starting a point in time copy operation to form the consistency group, wherein a first data structure and a second data structure are maintained in a track, and a plurality of tracks are maintained in a metadata storage area;

in response to determining that the second data structure indicates that there are new host writes, updating the first data structure with contents of the second data structure to determine which additional storage locations need to be copied for formation of a next consistency group by performing an OR operation of corresponding bits of the first data structure and the second data structure, and updating the second data structure to indicate that the second data structure is in an initialized state;

in response to determining that the second data structure indicates that there are no new host writes, updating of the first data structure with the contents of the second data structure is not performed; and in response to processing all of the plurality of tracks maintained in the metadata storage area, setting an indicator by a non-background task to indicate that all of the plurality of second data structures are now in the initialized state.

14. The computer program product of claim 13, wherein the first data structure is an out of synchronization bitmap.

15. The computer program product of claim 14, and the second data structure is a change recording bitmap.

16. The computer program product of claim 15, wherein the metadata storage area is a metadata track, and wherein a write access to the metadata track is necessary if any bit of the change recording bitmap is not zero.

17. The computer program product of claim 16, wherein the updating of the out of synchronization bitmap comprises performing an OR operation of corresponding bits of the change recording bitmap and the out of synchronization bitmap.

18. The computer program product of claim 13, the operations further comprising:
performing a remote copy operation of primary volumes of a primary computational device to secondary volumes of a remote computational device; and
performing a point in time copy operation to generate point in time copies of the secondary volumes of the remote computational device to tertiary volumes of the remote computational device.

* * * * *